(12) United States Patent
Hildebrand et al.

(10) Patent No.: US 11,323,809 B2
(45) Date of Patent: May 3, 2022

(54) METHOD FOR CONTROLLING A SOUND OUTPUT OF A HEARING DEVICE

(71) Applicant: SONOVA AG, Staefa (CH)

(72) Inventors: Nicola Hildebrand, Uster (CH); Erich Crameri, Zürich (CH); Marius Beuchert, Waedenswil (CH)

(73) Assignee: Sonova AG, Staefa (CH)

(*) Notice: Subject to any disclaimer, the term of this patent is extended or adjusted under 35 U.S.C. 154(b) by 98 days.

(21) Appl. No.: 16/997,751

(22) Filed: Aug. 19, 2020

(65) Prior Publication Data

US 2021/0058703 A1    Feb. 25, 2021

(30) Foreign Application Priority Data

Aug. 23, 2019 (EP) .................................. 19193287

(51) Int. Cl.
  *H04R 3/04* (2006.01)
  *G06F 1/03* (2006.01)
  (Continued)

(52) U.S. Cl.
  CPC ................ *H04R 3/04* (2013.01); *G06F 1/03* (2013.01); *G06F 17/10* (2013.01); *H04R 25/558* (2013.01);
  (Continued)

(58) Field of Classification Search
  CPC .. H04R 3/04; H04R 25/558; H04R 2225/025; H04R 2430/01; H04R 25/505; H04R 2225/61; H04R 25/554; H04R 25/30; H04R 25/305; H04R 25/50; H04R 25/70; G06F 1/03; G06F 17/10
  (Continued)

(56) References Cited

U.S. PATENT DOCUMENTS 6,175,635 B1 * 1/2001 Meyer .................... H04R 25/70
                                              381/312
6,574,340 B1 * 6/2003 Bindner ................. H04R 25/70
                                              381/312
(Continued)

FOREIGN PATENT DOCUMENTS

EP      0917397       5/1999
EP      0917398       5/1999
WO    2019105520      6/2019

*Primary Examiner* — Xu Mei
(74) *Attorney, Agent, or Firm* — ALG Intellectual Property, LLC

(57) ABSTRACT

A hearing device comprises basic modifiers adjustable by a user, each basic modifier having a range of basic modifier values selectable by the user and each basic modifier modifying a sound processing of the hearing device dependent on the respective basic modifier value. A method comprises: receiving a macro modifier value for a macro modifier, wherein the macro modifier is associated with a subset of the basic modifiers and wherein the macro modifier value is selected by the user from a macro modifier range; calculating, for each basic modifier in the subset, a basic modifier value, wherein the basic modifier value is calculated with a predefined function based on the macro modifier value; applying the calculated basic modifier values to the basic modifiers such that the sound processing of the hearing device is performed based on the basic modifiers adjusted with the calculated basic modifiers values.

13 Claims, 3 Drawing Sheets

(51) Int. Cl.
  *G06F 17/10* (2006.01)
  *H04R 25/00* (2006.01)
(52) U.S. Cl.
  CPC .... *H04R 2225/025* (2013.01); *H04R 2430/01* (2013.01)
(58) Field of Classification Search
  USPC .............................. 381/314, 321, 60; 73/585
  See application file for complete search history.

(56) References Cited

U.S. PATENT DOCUMENTS

| | | | |
|---|---|---|---|
| 7,664,279 B2* | 2/2010 | Flynn | H04R 25/70 381/314 |
| 9,877,117 B2* | 1/2018 | Sabin | H04R 25/70 |
| 2011/0051942 A1* | 3/2011 | Wilson | H04R 25/505 381/60 |
| 2015/0271607 A1 | 9/2015 | Sabin | |
| 2016/0205482 A1* | 7/2016 | Raether | H04R 25/558 381/314 |
| 2018/0063653 A1* | 3/2018 | Aschoff | H04R 25/558 |

* cited by examiner

METHOD FOR CONTROLLING A SOUND OUTPUT OF A HEARING DEVICE

RELATED APPLICATIONS

The present application claims priority to EP Patent Application No. 19193287.0, filed Aug. 23, 2019, the contents of which are hereby incorporated by reference in their entirety.

BACKGROUND INFORMATION

Hearing devices are generally small and complex devices. They may include a processor, microphone, speaker, memory, housing, and other electronical and mechanical components. Some examples of hearing devices are Behind-The-Ear (BTE), Receiver-In-Canal (RIC), In-The-Ear (ITE), Completely-In-Canal (CIC), and Invisible-In-The-Canal (IIC) devices. A user may prefer one of these hearing devices over another based on hearing loss, aesthetic preferences, lifestyle needs, and budget.

A hearing device often has functions (or so-called modifiers) for manually adjusting the sound output of the hearing device. For example, an overall volume, treble and bass may be adjustable by such modifiers. This may be sufficient for many users and for most of the situations they are in.

However, there may be situations where a user might want to modify more than just one modifier at a time. For example, some users also might want to switch their hearing device between a clarity mode and a comfort mode, which would involve modifying other modifiers than just volume.

BRIEF DESCRIPTION OF THE DRAWINGS

Below, embodiments of the present invention are described in more detail with reference to the attached drawings.

The reference symbols used in the drawings, and their meanings, are listed in summary form in the list of reference symbols. In principle, identical parts are provided with the same reference symbols in the figures.

DETAILED DESCRIPTION

Figure 1:
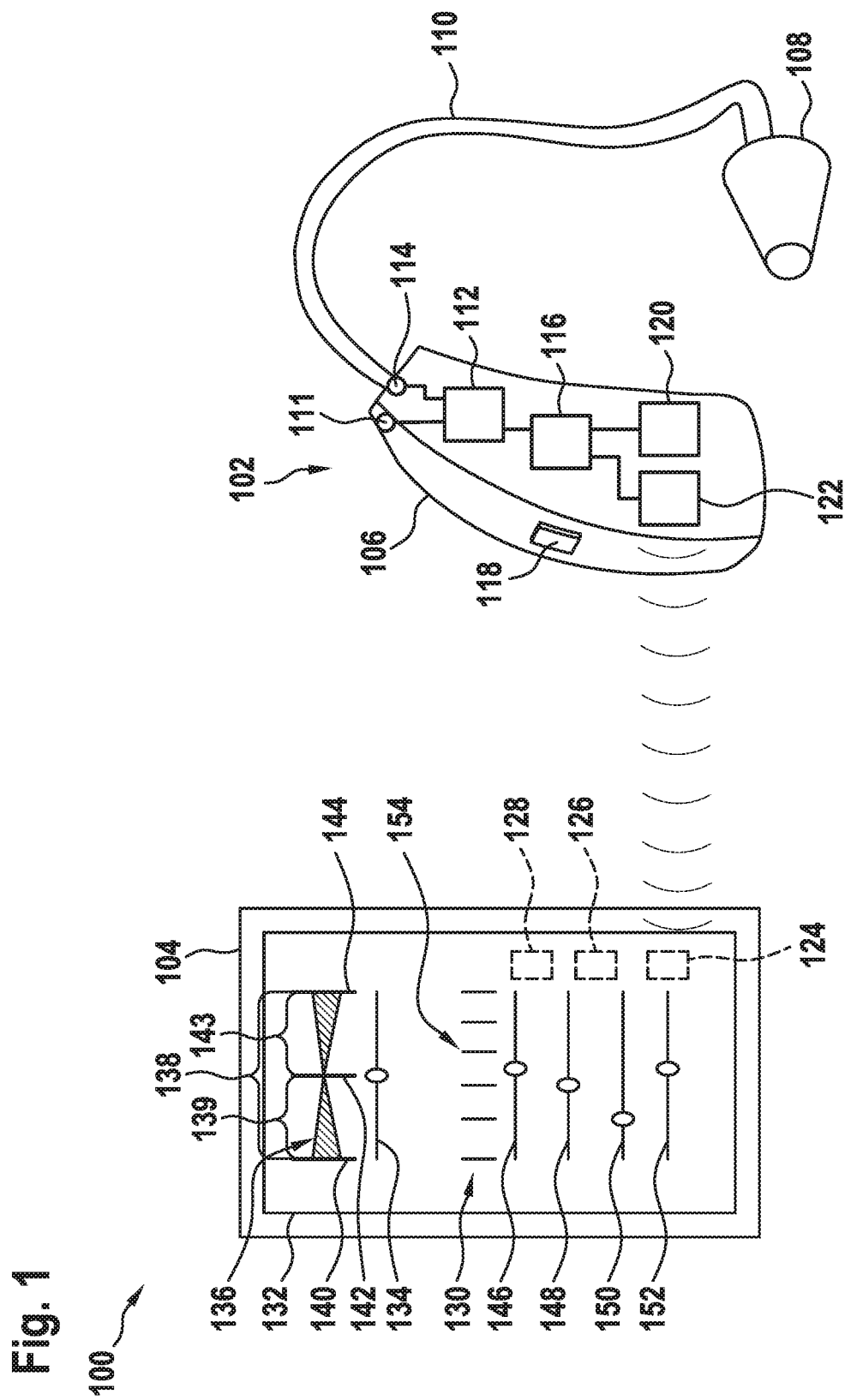
FIG. 1 schematically shows a hearing system according to an embodiment.

Described herein are a method, a computer program, a computer-readable medium and a hearing system for controlling a sound output of a hearing device.

An aspect described herein is to improve the selection and modification of sound modifiers implemented in a hearing device.

This aspect by the subject-matter of the independent claims. Further exemplary embodiments are evident from the dependent claims and the following description.

A first aspect relates to a method for controlling a sound output of a hearing device. A hearing device may be a hearing aid adapted for compensating the hearing loss of a user. The hearing device may comprise basic modifiers adjustable by the user, each basic modifier having a range of basic modifier values selectable by the user and each basic modifier modifying a sound processing of the hearing device dependent on the respective basic modifier value.

A basic modifier may be a sound modifier such as to modify overall volume, volume of low, middle or high frequency ranges, noise canceling, dynamic, speech focus, etc. The basic modifiers may be adjustable by selecting one of a range of at least two different basic modifier values. For example, the basic modifier values may include a maximum, minimum and/or neutral value. Additionally, the basic modifier values may include interpolation steps in between the at least two different values, for example in between the maximum, minimum and/or neutral value.

The sound processing may comprise the following steps: receiving a sound signal, for example from a microphone and/or via a wireless radio transmission; amplifying and/or filtering the sound signal based on the selected basic modifier values; outputting the amplified and/or filtered sound signal to the ear of the user of the hearing device, for example through a loudspeaker and/or a so-called receiver. The sound signal may be amplified and/or filtered dependent on frequencies included in the sound signal.

The method as described above and below may be performed automatically by the hearing device or, optionally, by a mobile device in data communication with the hearing device.

According to an embodiment, the method comprises: receiving a macro modifier value for a macro modifier, wherein the macro modifier is associated with a subset of the basic modifiers and wherein the macro modifier value is selected by the user from a macro modifier range; calculating, for each basic modifier in the subset, a basic modifier value, wherein the basic modifier value is calculated with a predefined function based on the macro modifier value; applying the calculated basic modifier values to the basic modifiers such that the sound processing of the hearing device is performed based on the basic modifiers adjusted with the calculated basic modifier values.

A subset of basic modifiers may include at least two different basic modifiers. Thus, a macro modifier may be a modifier which is used to modify at least two different basic modifiers at a time. In other words, by selecting or modifying one macro modifier value, at least two basic modifier values are selected or calculated based on a predefined function. A predefined function may be a function which defines a set of basic modifier values depending on a selected macro modifier value, for example by mathematically calculating the basic modifier values in an input/output operation or by selecting them in a stored lookup table containing an array of indexed basic modifier values.

By applying the calculated or selected basic modifier values to the corresponding basic modifiers, any existing values for these basic modifiers may be overwritten.

The basic modifiers and/or the macro modifiers may be adjustable via an appropriate interface such as an application on a mobile device with appropriate basic modifier and/or macro modifier control elements or dedicated buttons and/or sliders on the hearing device itself. The basic modifier values and/or the macro modifier values may be displayed to the user as numerical values, for example on an interval scale from −n to +n, or as nominal values such as "less", "more", "wide", "narrow", "soft", "loud", "minimum", "neutral", "maximum".

According to an embodiment, the predefined function is a mathematical function and/or selects a value from a lookup table. The mathematical function and/or the lookup table may be stored in the hearing device. For example, the lookup table may be precalculated and stored in static program storage, calculated or pre-fetched as part of a program's initialization phase, also called memorization, or in hardware in an application-specific platform. In general, the mathematical function may be determined by a curve which may be defined by a set of points. Values in between these points may then be determined by interpolation. The predefined function may be, for example, a linear function or a function that finds approximate values based on human perception. This embodiment may allow for efficient calculating of the basic modifier values. Especially by using a lookup table, that is, by retrieving the basic modifier values from memory, savings in terms of processing time may be significant.

According to an embodiment, the macro modifier range is divided into a first range between a first value and a neutral value and a second range between the neutral value and a second value. Generally speaking, the first value and the second value may describe opposite extremes such as "maximum comfort" as opposed to "maximum clarity" or "soft" as opposed to "loud". For example, as already mentioned above, the first value may be a minimum value whereas the second value may be a maximum value. The first range may include only negative values whereas the second range may include only positive values. Alternatively, both of the ranges may include negative and/or positive values. The neutral value may be considered as a reference or starting point for any modifications of the macro modifier. Thus, the neutral value may be zero. For example, the neutral value may correspond to a neutral preset of basic modifier values. The first range and the second range may each have the same number of discrete values or steps. Alternatively, the first range and the second range may have different numbers of steps. Additionally, values in between the steps may be interpolated based on linear or perceptive approximation, which may be dependent on the range and/or the number of steps.

According to an embodiment, when the macro modifier value is selected from the first range, the basic modifier value is calculated with a first predefined function. Additionally or alternatively, when the macro modifier value is selected from the second range, the basic modifier value may be calculated with a second predefined function. For example, the two functions may be used to look up the basic modifier value in different lookup tables or may describe different curves for calculating the basic modifier value. It also may be that the first function is a linear function whereas the second function is a nonlinear function, or vice versa. This embodiment allows for an asymmetric sound processing dependent on a chosen range.

According to an embodiment, when the macro modifier value is selected from the first range, a value of at least one volume modifier is decreased and/or a value of at least one additional basic modifier is increased. Additionally or alternatively, when the macro modifier value is selected from the second range, a value of at least one volume modifier may be increased and/or a value of at least one additional basic modifier may be decreased. A volume modifier may modify an overall volume or a volume of a specific frequency band specifying, for example a treble range, a middle range or a bass range. An additional basic modifier may modify dynamic, for example emphasize soft sounds and/or limit loud sounds, noise canceling or beamforming, which may be used for focusing on speech. For example, when selecting the macro modifier value from the first range, the overall volume may be decreased whereas the limiting of loud sounds may be increased. Inversely, when selecting the macro modifier value from the second range, the overall volume may be increased whereas the limiting of loud sounds may be decreased in favor of emphasizing soft sounds. This may allow for an easy frequency-dependent volume control.

According to an embodiment, when the macro modifier value is selected from the second range, a value of at least one other additional basic modifier is increased. For example, when decreasing the limiting of loud sounds in order to emphasize soft sounds, speech focus and/or noise canceling may be increased accordingly. In this way, clarity of the output sound signal may be improved.

According to an embodiment, the additional basic modifier is a dynamic modifier for emphasizing soft sounds and/or limiting loud sounds. Additionally or alternatively, the other additional basic modifier may be a noise cancellation modifier and/or a speech focus modifier. As exemplarily described above, this may have the advantage that, by selecting a single (macro modifier) value, clarity is improved.

According to an embodiment, when the macro modifier value is selected from the first range, a value of an overall volume and/or a value of a treble volume and/or a value of a middle volume is decreased. Additionally or alternatively, when the macro modifier value is selected from the second range, a value of an overall volume may be increased and/or not modified and/or a value of a treble volume and/or a value of a middle volume may be increased. An overall volume may be an overall amplification level of the sound signal. A treble volume may be a frequency-dependent volume of a high frequency range comprising frequencies above 4 kHz. A middle volume may be a frequency-dependent volume of a middle frequency range comprising frequencies between 2 kHz and 4 kHz. This may allow to modify frequency-dependent volumes by selecting the macro modifier value.

According to an embodiment, the method further comprises: providing a user interface with a mobile device of the user, wherein the user interface comprises a macro modifier control element changeable by the user for selecting the macro modifier value; when the user has selected the macro modifier value: sending the selected macro modifier value from the mobile device to the hearing device. A mobile device may be a device carried by the user, such as a smartphone, tablet or laptop. The user interface may be part of an application provided by the mobile device. The application may be considered as a computer program for adjusting parameters in the hearing device. The user interface may comprise a graphical interface for operating the computer program. The mobile device may be connectable to the hearing aid via a wired or wireless data communication network, for example Wi-Fi, Bluetooth or a mobile internet connection, in order to transmit the selected macro modifier value. Optionally, the mobile device itself may be configured for calculating the basic modifier values based on the selected macro modifier value and sending the calculated basic modifier values to the hearing device. A macro modifier control element may be a button, a slider or an input field for entering a macro modifier value. This may allow for a user-friendly configuration of the sound output of the hearing device. Another advantage may be that the user interface is easy to update.

According to an embodiment, the method further comprises: providing a user interface with a mobile device of the user, wherein the user interface comprises basic modifier control elements changeable by the user for selecting basic modifier values; when the user has selected a basic modifier value: sending the selected basic modifier value from the mobile device to the hearing device and overwriting the calculated basic modifier value which has been calculated based on the macro modifier value. Similar to the macro modifier control element, a basic modifier control element may be a button, a slider or an input field for entering a basic modifier value.

For example, the user interface may provide both the macro modifier control element and the basic modifier control elements for maximum configurability of the sound output of the hearing device. In this case, the basic modifier control elements may visually change depending on a change of the macro modifier control element. This enables the user to see how changes of the macro modifier impact on the basic modifiers.

The user interface may provide a locked mode where the basic modifier control elements are locked so that the basic modifiers can only be changed through the macro modifier control element, that is, through a calculation based on the selected macro modifier value and the predefined function.

The user interface may also provide an unlocked mode where the basic modifier control elements are unlocked so that the basic modifiers can be changed manually and/or through the macro modifier control element. In this case, a basic modifier value resulting from a manual change of the respective basic modifier control element may overwrite a previously calculated basic modifier value. For example, the user interface may also provide a reset function in order to reset a basic modifier to a previously calculated basic modifier value.

A further aspect relates to a computer program which, when being executed in a processor, is adapted to carry out the steps of the method as described above and below.

A further aspect relates to a computer-readable medium in which such a computer program is stored. In general, a computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. In general, the computer-readable medium may be a non-transitory or transitory medium.

For example, the computer program may be executed in a processor of the hearing device, which, for example, may be carried behind the user's ear. The computer-readable medium may be a memory of said hearing device. The computer program may also be executed, at least partially, by a processor of a mobile device. The computer-readable medium may be a memory of the mobile device. It may be that some steps of the method as described above and below are performed by the hearing device whereas some other steps of the method as described above and below are performed by the mobile device.

A further aspect relates to a hearing system adapted for performing the method as described above and below. The hearing system may comprise a hearing device and, optionally, a mobile device providing a user interface as described above. The hearing device and/or the mobile device may comprise a processor and a memory in which the computer program is stored. The hearing device may comprise a microphone for acquiring a sound signal which is processed with the method as described above and below.

It has to be understood that features of the method as described above and below may be features of the computer program, the computer-readable medium and the hearing system as described above and below, and vice versa.

These and other aspects will be apparent from and elucidated with reference to the embodiments described hereinafter.

FIG. 1 schematically shows a hearing system 100 with a hearing device 102 in the form of a behind-the-ear device and a mobile device 104. It has to be noted that the hearing device 102 is a specific embodiment and that the method described herein also may be performed by other types of hearing devices, such as in-the-ear devices.

The hearing device 102 comprises a case 106 to be put behind an ear of a user, a dome tip 108 to be inserted into an external auditory canal of the ear, and a tube 110 connecting the case 106 with the dome tip 108. In the case 106, a microphone 110, a sound processor 112 and a sound output device 114, such as a loudspeaker or receiver, are provided. The case 106 may also contain a battery. The microphone 110 may acquire environmental sound and generate a sound signal accordingly. The sound processor 112 may amplify the sound signal. The sound output device 114 may generate sound that is guided through the tube 110 and the dome tip 108 into the auditory canal of the user.

The hearing device 102 may further comprise a processor 116 which is adapted for adjusting parameters of the sound processor 112. The parameters control a frequency-dependent and/or volume-dependent amplification of the sound signal. Among others, the parameters may comprise basic modifier parameters for modifying the sound signal with different basic modifiers such as volume, bass, treble, noise canceling, speech focus, dynamic, etc.

The parameters may be determined by a computer program run in the processor 116. The case 106 may have a button 118, for example a knob, to select a basic modifier as well as levels and/or values of a selected basic modifier. These levels and/or values may then be applied to the sound signal by the sound processor 112. Said functions may be implemented as computer programs stored in a memory 120 of the hearing device 102. The computer programs may be executed by the processor 116.

The hearing device 102 may further comprise a sender/receiver 122 for, for example, wireless data communication with a sender/receiver 124 of the mobile device 104, which may be a smartphone or tablet computer. It is also possible that the above-mentioned basic modifiers and/or their levels and/or values are adjusted with the mobile device 104. This may be performed with a computer program run in a processor 126 of the mobile device 104 and stored in a memory 128 of the mobile device 104. The computer program may provide a graphical user interface 130 on a display 132 of the mobile device 104.

In order to adjust the basic modifiers, the user interface 130 may comprise a macro modifier control element 134, for example in the form of a slider as shown in FIG. 1, which is used for selecting a macro modifier value 136 of a macro modifier. The macro modifier is associated with a subset of basic modifiers to be adjusted. The selected macro modifier value 136 may then be sent to the hearing device 102. Alternatively or additionally, the user may select the macro modifier value 136 with the hearing device 102 itself, for example via the button 118.

The macro modifier value 136 may be selected from a macro modifier range 138 comprising a first range 139 between a first value 140 and a neutral value 142 and a second range 143 between the neutral value 142 and a second value 144. The three values 140, 142, 144 are each indicated by a vertical line.

Based on the macro modifier value 136, the hearing device 102 may calculate parameters for each basic modifier in the subset with a predefined function and change parameters of the sound processor 112 accordingly. Parameters corresponding to macro modifier values 136 in between the three values 140, 142, 144 may be interpolated by the mobile device 104. An interpolation area of the macro modifier range 138 may be indicated by two facing arrows.

Additionally or alternatively, based on the macro modifier value 136, the mobile device 104 may calculate parameters for each basic modifier in the subset with a predefined function. In this case, the calculated parameters may be sent to the hearing device 102 which may then change parameters of the sound processor 112 accordingly.

The user interface 130 may also comprise several basic modifier control elements 146, 148, 150, 152 each of which may be used to manually select a basic modifier value 154 for the respective basic modifier. A basic modifier value 154 may be seen as a parameter for a basic modifier. The manually selected basic modifier values 154 may then be sent to the hearing device 102 which may change parameters of the sound processor 112 accordingly. In particular, the hearing device 102 may overwrite previously calculated parameters for the basic modifiers with the manually selected basic modifier values 154.

Additionally or alternatively, the basic modifier control elements 146, 148, 150, 152 may be changed with the macro modifier control element 134. In this case, based on the selected macro modifier value 136, the mobile device 104 may calculate the basic modifier values 154 for each of the basic modifiers controlled by the basic modifier control elements 146, 148, 150, 152 and, optionally, change a position of the basic modifier control elements 146, 148, 150, 152 accordingly.

The adjustment of the basic modifiers with the mobile device 104 will be explained in more detail below.

Figure 2:
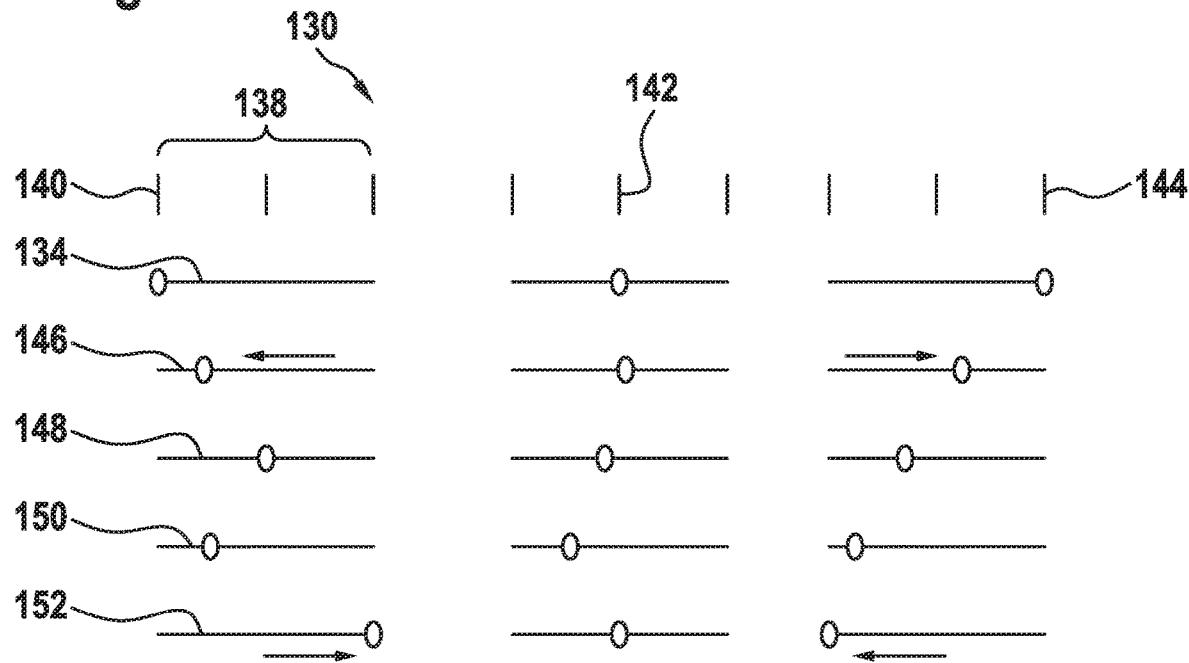
FIG. 2 schematically shows the user interface of FIG. 1 with a macro modifier for controlling dynamic volume.

FIG. 2 schematically shows the user interface 130 of FIG. 1 with a macro modifier for controlling dynamic volume. In this example, the macro modifier is associated with the following subset of four different basic modifiers: volume (controlled by the basic modifier element 146), noise canceling (controlled by the basic modifier element 148), speech focus (controlled by the basic modifier element 150), and dynamic (controlled by the basic modifier element 152). Exemplarily, FIG. 2 shows different positions of the basic modifier control elements 146, 148, 150, 152 depending on whether the macro modifier is set to the first value 140, the neutral value 142 or the second value 144 by the user. In FIG. 2, the neutral value 142 corresponds to a medium dynamic volume whereas the first value 140 corresponds to a minimum dynamic volume ("soft") and the second value 144 to a maximum dynamic volume ("loud").

When the user selects the neutral value 142 for the macro modifier, volume and dynamic may each be set to a middle position whereas noise canceling and speech focus may be set to different positions between a middle position and a minimum position.

When the user selects the first value 140 for the macro modifier, volume may be decreased to a position between the middle position and a minimum position whereas dynamic may be increased to a maximum position, which means that loud sounds are now limited.

Inversely, when the user selects the second value 144 for the macro modifier, volume may be increased to a position between the middle position and a maximum position whereas dynamic may be decreased to a minimum position, which means that soft sounds are now emphasized. Noise canceling and speech focus may each remain unchanged.

Adjustments of the basic modifier values 154 resulting from position changes of the macro modifier control element 134 are indicated by arrows.

A position change of a macro modifier control element 134 may be seen as an adjustment of a corresponding macro modifier and/or as a selection of a corresponding macro modifier value 136. A position change of a basic modifier control element 146, 148, 150, 152 may be seen as an adjustment of a corresponding basic modifier and/or as a selection of a corresponding basic modifier value 154. A basic modifier control element 146, 148, 150, 152 may be changed directly and/or individually and/or with a macro modifier control element 134.

When the user selects a macro modifier value 136 in between the three values 140, 142, 144, the corresponding basic modifier values 154 may be interpolated by linear or perceptive approximation. The macro modifier range 138 as shown in FIG. 2 may, for example, have a step size of −4 (minimum dynamic volume, "soft") to +4 (maximum dynamic volume, "loud").

Figure 3:
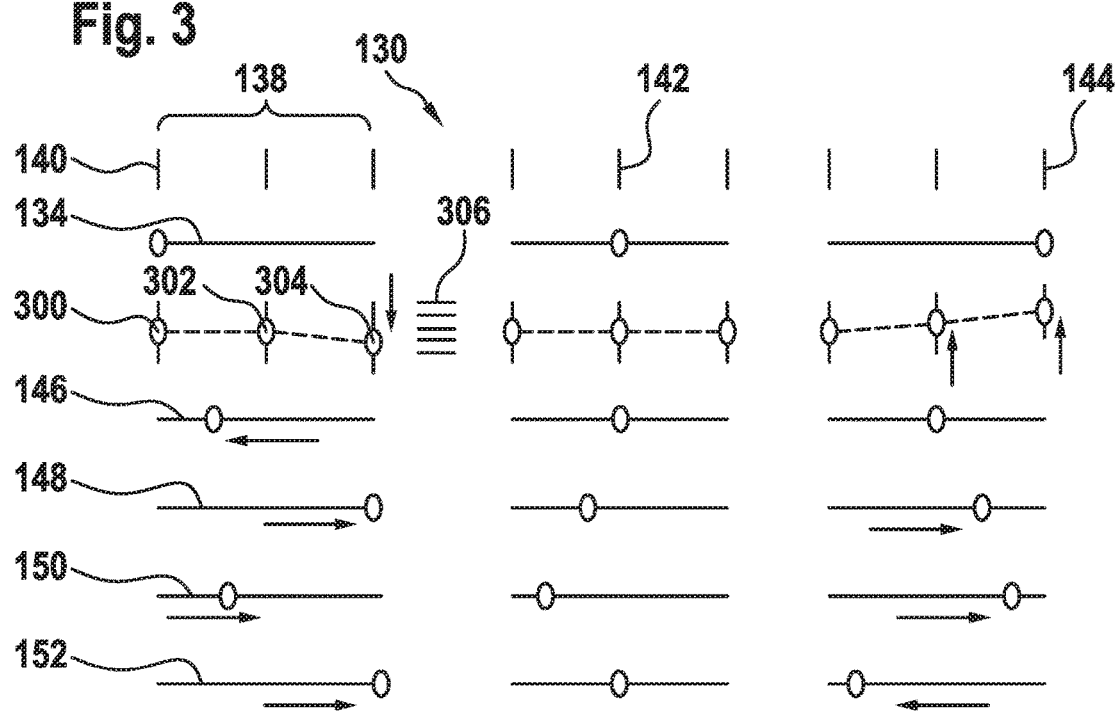
FIG. 3 schematically shows the user interface of FIG. 1 with a macro modifier for controlling comfort and clarity.

FIG. 3 schematically shows the user interface 130 of FIG. 1 with a macro modifier for controlling comfort and clarity. In contrast to the embodiment shown in FIG. 2, the user interface 130 comprises, in FIG. 3, three volume modifier control elements 300, 302, 304 for selecting volume modifier values 306 for bass volume, middle volume and treble volume. The volume modifier values 306 are indicated by short horizontal lines. The volume modifier control elements 300, 302, 304 may be seen as basic modifier control elements for controlling basic modifiers. Consequently, the volume modifier values 306 may be adjusted by the macro modifier in the same manner as the basic modifier values 154 as described above with FIG. 1 and FIG. 2.

In this example, the first value 140 corresponds to a maximum comfort whereas the second value 144 corresponds to a maximum clarity.

When the user selects the neutral value 142, volume, noise canceling, speech focus and dynamic may each be set to a neutral position. More precisely, volume and dynamic may each be set to the middle position whereas noise canceling and speech focus may be set to different positions between the middle position and the minimum position. Further, bass volume, middle volume and treble volume may each be set to a middle position.

When the user selects the first value 140, volume may be slightly decreased to a position between the middle position and the minimum position whereas noise canceling, speech focus and dynamic may each be increased. More precisely, noise canceling and dynamic may each be set to a maximum position whereas speech focus may be increased only slightly to a position between the middle position and the minimum position. Further, treble volume may be slightly decreased to a position between the middle position and a minimum position whereas both bass volume and middle volume may remain unchanged.

When the user selects the second value 144, volume may remain unchanged whereas noise canceling and speech focus may be increased to different positions between the middle position and the maximum position, and dynamic may be decreased to a position between the middle position and the minimum position. More precisely, noise canceling may be increased less and speech focus may be increased more than when the user selects the first value 140. Further, middle volume and treble volume may be increased to different positions between the middle position and a maximum position whereas bass volume may remain unchanged. More precisely, treble volume may be increased more than middle volume.

As in FIG. 2, adjustments of the basic modifier values 154 and the volume modifier values 306 resulting from position changes of the macro modifier control element 134 are indicated by arrows. A position change of a volume modifier control element 146, 148, 150, 152 may be seen as an adjustment of a corresponding volume modifier and/or as a selection of a corresponding volume modifier value 306.

When the user selects a macro modifier value 136 in between the three values 140, 142, 144, the corresponding volume modifier values 306 may be interpolated by linear or perceptive approximation.

The user interface 130 may provide means for switching between different macro modifier modes, for example between a first macro modifier mode for controlling dynamic volume as described in FIG. 2 and a second macro modifier mode for controlling comfort and clarity as described in FIG. 3. When the user selects the first macro modifier mode, the basic modifier value 154 for each basic modifier associated with the macro modifier may be calculated based on a first set of functions whereas, when the user selects the second macro modifier mode, the basic modifier value 154 for each basic modifier associated with the macro modifier may be calculated based on a second set of functions different from the first set of functions. Thus, the same macro modifier value 136 may result in different basic modifier values 154 depending on which macro modifier mode is selected.

It may be that different macro modifier modes comprise different subsets of basic modifiers associated to the macro modifier, that is, different numbers and different sorts of basic modifiers.

Figure 4:
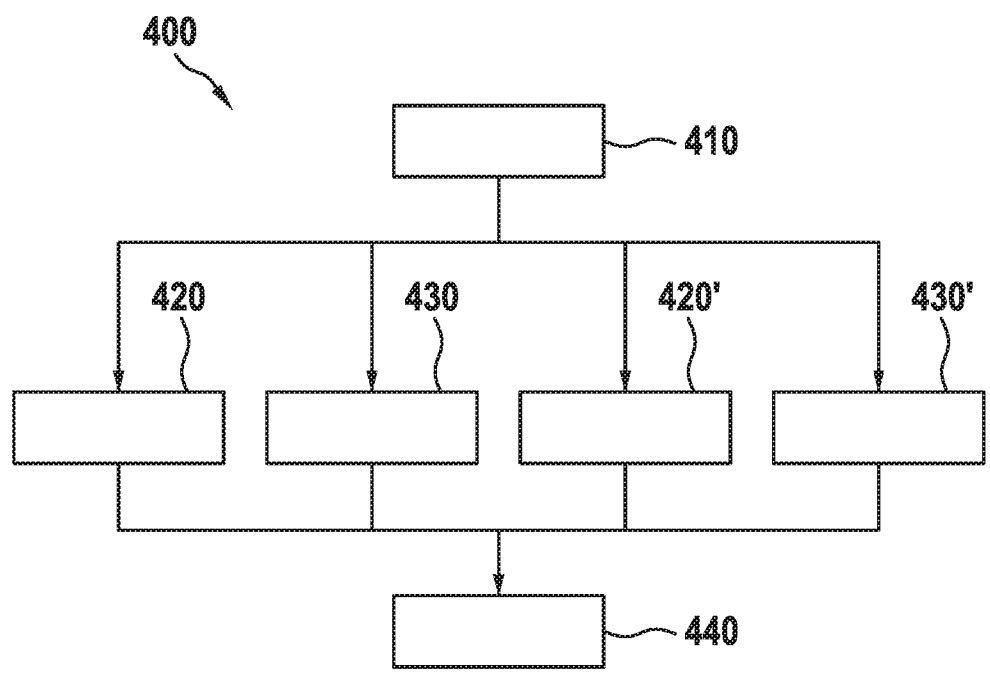
FIG. 4 shows a flow diagram for a method for controlling a sound output of a hearing device according to an embodiment.

FIG. 4 shows a flow diagram for a method 400 for controlling a sound output of a hearing device. The method 400 may be performed with the hearing system 100 of FIG. 1.

In step 410, the user interface 130 is provided with the mobile device 104 and the macro modifier control element 134 is shown to the user. The user may then select a macro modifier value 136 from the macro modifier range 138. When the user has selected the macro modifier value 136, it is sent from the mobile device 104 to the hearing device 102.

Alternatively, the user may select a macro modifier value 136 with a user interface of the hearing device 102, such as the button 118.

In the end, the macro modifier value 136 is received in a computer program executed in the hearing device 102 which performs the following steps.

The macro modifier value 136 received in the hearing device 102 may be seen as a demand for adjusting different basic modifiers at a time.

The method continues in step 420 when the macro modifier value 136 is selected from the first range 139 included in the macro modifier range 138 or in step 430 when the macro modifier value 136 is selected from the second range 143 included in the macro modifier range 138.

In step 420, the basic modifier values 154 for a subset of basic modifiers associated to the macro modifier may be calculated with a first set of predefined functions depending on the selected macro modifier value 136. The functions may differ from one basic modifier to another.

In step 430, the basic modifier values 154 may be calculated with a second set of predefined functions depending on the selected macro modifier value 136. The functions of the second set may differ from one or more functions of the first set and, additionally, from one basic modifier to another.

Steps 420 and 430 may be performed when the user has selected the first macro modifier mode as described above. Optionally, the method may continue in steps 420' or 430' when the user has selected the second macro modifier mode.

In step 420', the basic modifier values 154 may be calculated with a third set of predefined functions depending on the selected macro modifier value 136. The functions of the third set may differ from one or functions of the first set and/or the second set. The functions of the third set may additionally differ from one basic modifier to another.

In step 430', the basic modifier values 154 may be calculated with a fourth set of predefined functions depending on the selected macro modifier value 136. The functions of the fourth set may differ from one or more functions of the third set. Additionally, the functions of the fourth set may differ from one or more functions of the first set and/or the second set and/or from one basic modifier to another.

The functions used in steps 420, 420', 430, 430' may be mathematical functions for calculating the basic modifier values 154 with the sound processor 112 and/or lookup functions for selecting the basic modifier values 154 from one or more lookup tables stored in the memory 120.

In step 440 the calculated basic modifier values 154 are applied to the corresponding basic modifiers. This means, for example, that the calculated basic modifier values 154 are used to set parameters of the sound processor 112 so that the sound signal output by the sound output device 114 is modified accordingly.

For example, a demand for increasing an overall volume and/or decreasing a dynamic, that is, for emphasizing soft sounds, of the output sound signal may be received when the macro modifier value 136 is increased in the first macro modifier mode. Inversely, a demand for decreasing an overall volume and/or increasing a dynamic, that is, for limiting loud sounds, of the output sound signal may be received when the macro modifier value 136 is decreased in the first macro modifier mode.

Additionally or alternatively, a demand for increasing noise canceling and/or speech focus and/or a middle volume and/or a treble volume and/or for decreasing a dynamic of the output sound signal may be received when the macro modifier value 136 is increased in the second macro modifier mode. Inversely, a demand for decreasing an overall volume and/or a treble volume and/or speech focus and/or for increasing noise canceling and/or a dynamic of the output sound signal may be received when the macro modifier value 136 is decreased in the second macro modifier mode.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures

LIST OF REFERENCE SYMBOLS 100 hearing system
102 hearing device
104 mobile device
106 case
108 dome tip
110 tube
112 sound processor
114 sound output device
116 processor of the hearing device
118 button
120 memory of the hearing device
122 sender/receiver of the hearing device
124 sender/receiver of the mobile device
126 processor of the mobile device
128 memory of the mobile device
130 user interface
132 display
134 macro modifier control element
136 macro modifier value
138 macro modifier range
139 first range
140 first value
142 neutral value
143 second range
144 second value
146 basic modifier control element
148 basic modifier control element
150 basic modifier control element
152 basic modifier control element
154 basic modifier value
300 volume modifier control element
302 volume modifier control element
304 volume modifier control element
306 volume modifier value
400 method for controlling a sound output of a hearing device
410 step of receiving the macro modifier value
420 step of calculating basic modifier values based on a first set of predefined functions
430 step of calculating basic modifier values based on a second set of predefined functions
420' step of calculating basic modifier values based on a third set of predefined functions
430' step of calculating basic modifier values based on a fourth set of predefined functions
440 step of applying the basic modifier values

What is claimed is:

1. A method for controlling a sound output of a hearing device, wherein the hearing device comprises basic modifiers adjustable by a user of the hearing device, each basic modifier having a range of basic modifier values selectable by the user and each basic modifier modifying a sound processing of the hearing device dependent on the respective basic modifier value;
wherein the method comprises:
receiving a macro modifier value for a macro modifier, wherein the macro modifier is associated with a subset of the basic modifiers and wherein the macro modifier value is selected by the user from a macro modifier range;
calculating, for each basic modifier in the subset, a basic modifier value, wherein the basic modifier value is calculated with a predefined function based on the macro modifier value; and
applying the calculated basic modifier values to the basic modifiers such that the sound processing of the hearing device is performed based on the basic modifiers adjusted with the calculated basic modifiers values.

2. The method of claim 1, wherein the predefined function is a mathematical function and/or selects a value from a lookup table.

3. The method of claim 1, wherein the macro modifier range is divided into a first range between a first value and a neutral value and a second range between the neutral value and a second value.

4. The method of claim 3,
wherein, when the macro modifier value is selected from the first range, the basic modifier value is calculated with a first predefined function; and/or
wherein, when the macro modifier value is selected from the second range, the basic modifier value is calculated with a second predefined function.

5. The method of claim 3,
wherein, when the macro modifier value is selected from the first range, a value of at least one volume modifier is decreased and/or a value of at least one additional basic modifier is increased; and/or
wherein, when the macro modifier value is selected from the second range, a value of at least one volume modifier is increased and/or a value of at least one additional basic modifier is decreased.

6. The method of claim 5, wherein, when the macro modifier value is selected from the second range, a value of at least one other additional basic modifier is increased.

7. The method of claim 5,
wherein the additional basic modifier is a dynamic modifier for emphasizing soft sounds and/or limiting loud sounds; and/or
wherein the other additional basic modifier is a noise cancellation modifier and/or a speech focus modifier.

8. The method of claim 3,
wherein, when the macro modifier value is selected from the first range, a value of an overall volume and/or a value of a treble volume and/or a value of a middle volume is decreased; and/or
wherein, when the macro modifier value is selected from the second range, a value of an overall volume is increased and/or not modified and/or a value of a treble volume and/or a value of a middle volume is increased.

9. The method of claim 1, further comprising:
providing a user interface with a mobile device of the user, wherein the user interface comprises a macro modifier control element changeable by the user for selecting the macro modifier value;
when the user has selected the macro modifier value: sending the selected macro modifier value from the mobile device to the hearing device.

10. The method of claim 1, further comprising:
providing a user interface with a mobile device of the user, wherein the user interface comprises basic modifier control elements changeable by the user for selecting basic modifier values;
when the user has selected a basic modifier value: sending the selected basic modifier value from the mobile device to the hearing device and overwriting the calculated basic modifier value which has been calculated based on the macro modifier value.

11. A non-transitory computer-readable medium for controlling a sound output of a hearing device, wherein the hearing device comprises basic modifiers adjustable by a user of the hearing device, each basic modifier having a range of basic modifier values selectable by the user and each basic modifier modifying a sound processing of the hearing device dependent on the respective basic modifier value, the non-transitory computer-readable medium storing a computer program that, when executed, directs a processor to:
- receive a macro modifier value for a macro modifier, wherein the macro modifier is associated with a subset of the basic modifiers and wherein the macro modifier value is selected by the user from a macro modifier range;
- calculate, for each basic modifier in the subset, a basic modifier value, wherein the basic modifier value is calculated with a predefined function based on the macro modifier value; and
- apply the calculated basic modifier values to the basic modifiers such that the sound processing of the hearing device is performed based on the basic modifiers adjusted with the calculated basic modifiers values.

12. A hearing system comprising a hearing device, wherein the hearing device comprises basic modifiers adjustable by a user of the hearing device, each basic modifier having a range of basic modifier values selectable by the user and each basic modifier modifying a sound processing of the hearing device dependent on the respective basic modifier value, wherein the hearing system is adapted to:
- receive a macro modifier value for a macro modifier, wherein the macro modifier is associated with a subset of the basic modifiers and wherein the macro modifier value is selected by the user from a macro modifier range;
- calculate, for each basic modifier in the subset, a basic modifier value, wherein the basic modifier value is calculated with a predefined function based on the macro modifier value; and
- apply the calculated basic modifier values to the basic modifiers such that the sound processing of the hearing device is performed based on the basic modifiers adjusted with the calculated basic modifiers values.

13. The hearing system of claim 12, wherein the hearing system further comprises a mobile device providing a user interface for selecting the macro modifier value and/or the basic modifier values.

\* \* \* \* \*